United States Patent [19]

Spretnjak

[11] 4,124,054

[45] Nov. 7, 1978

[54] WINDOW ASSEMBLY FOR A VEHICLE

[75] Inventor: Steve A. Spretnjak, Elkhart, Ind.

[73] Assignee: Excel Industries, Inc., Elkhart, Ind.

[21] Appl. No.: 835,317

[22] Filed: Sep. 21, 1977

[51] Int. Cl.² ............................................. E06B 3/46
[52] U.S. Cl. .................................... 160/90; 49/413; 296/23 MC
[58] Field of Search ............... 49/413, 501; 160/90, 160/91; 296/23 MC

[56] References Cited

U.S. PATENT DOCUMENTS

| 2,770,487 | 11/1956 | Isbell | 49/413 |
| 2,805,097 | 9/1957 | Barber | 49/413 X |
| 2,820,992 | 1/1958 | Clayton-Wright | 49/413 X |
| 3,321,234 | 5/1967 | Harrell et al. | 49/413 X |
| 3,808,742 | 5/1974 | Ehret et al. | 49/413 |
| 4,042,004 | 8/1977 | Kwan | 49/501 |

Primary Examiner—Kenneth Downey
Attorney, Agent, or Firm—Oltsch, Knoblock & Hall

[57] ABSTRACT

A window assembly which is for mounting in a four-sided vehicle body opening and which includes a rigidifying frame having open ends receiving glass end panels. A glass center panel is carried by the assembly frame and is shiftable over a center opening formed between the two glass end panels.

11 Claims, 17 Drawing Figures

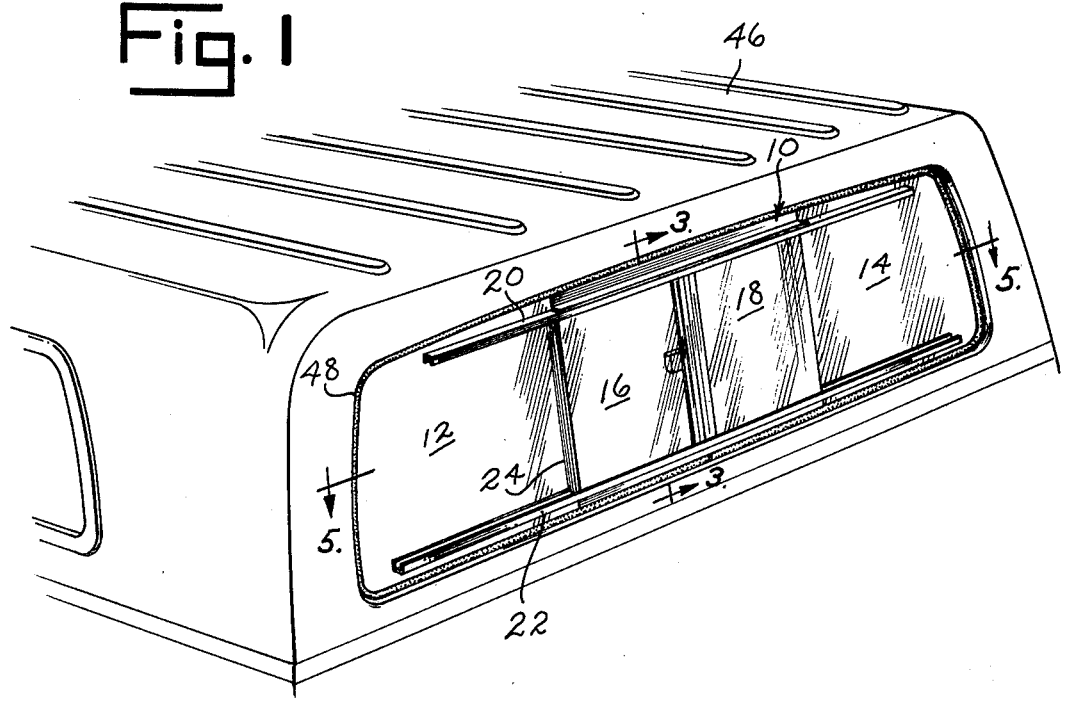
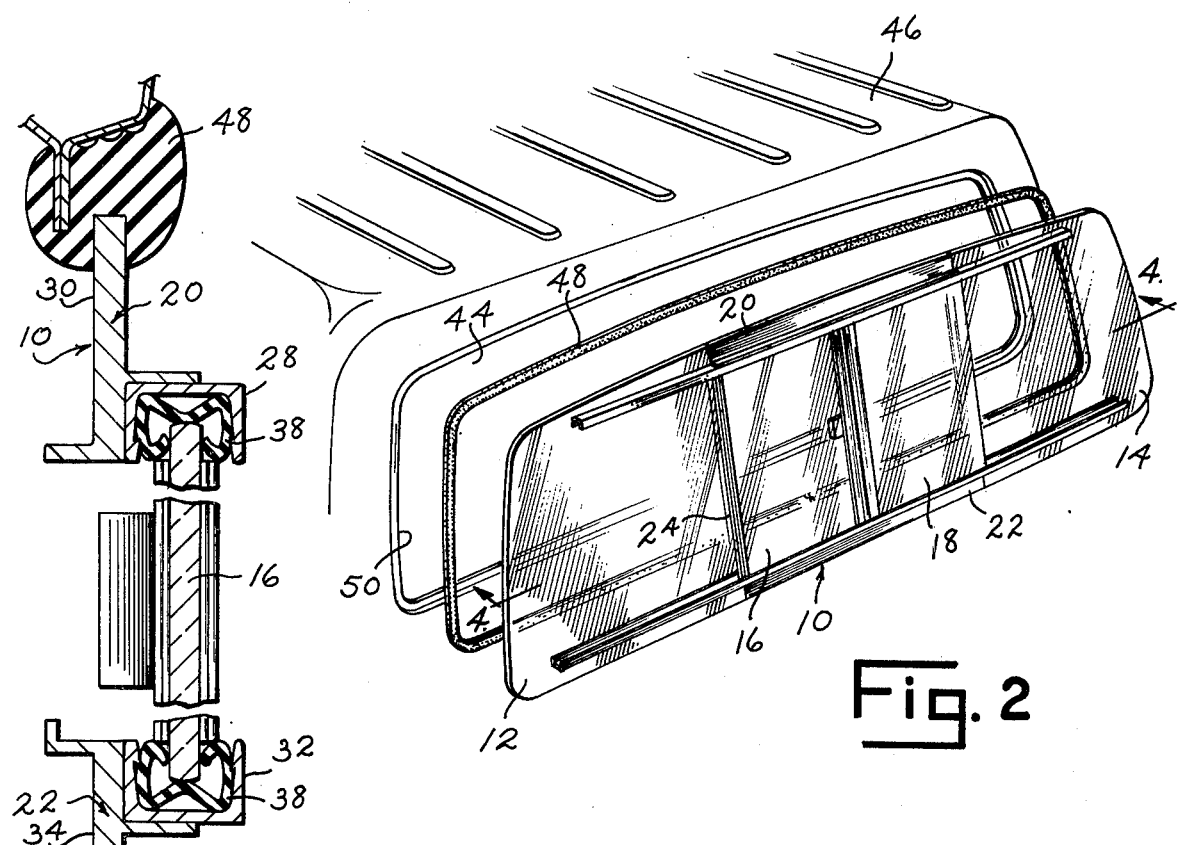

U.S. Patent    Nov. 7, 1978    Sheet 2 of 5    4,124,054
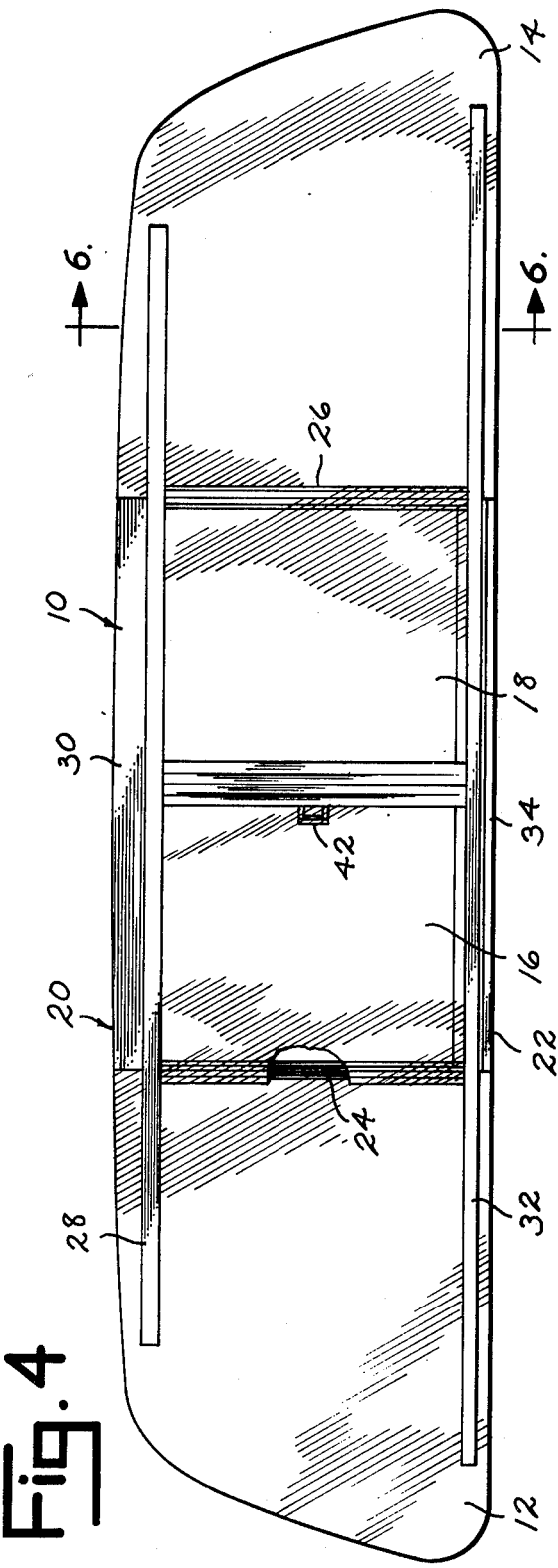
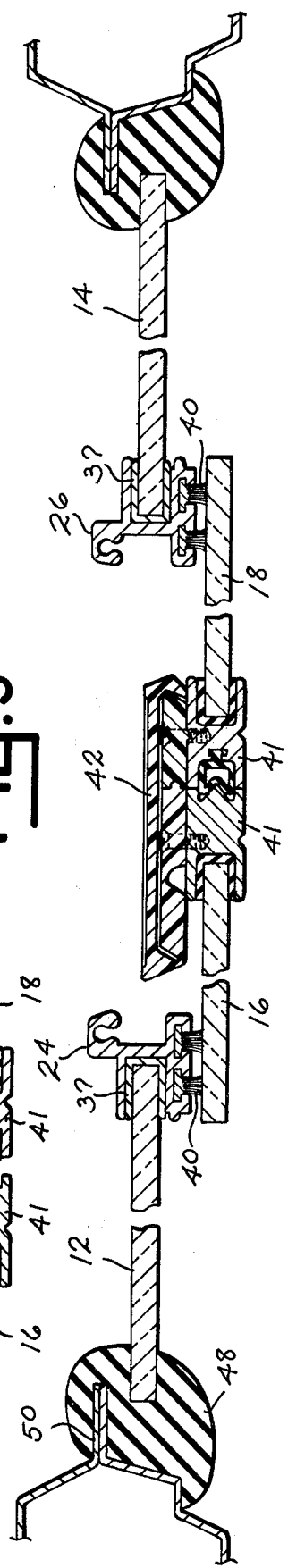

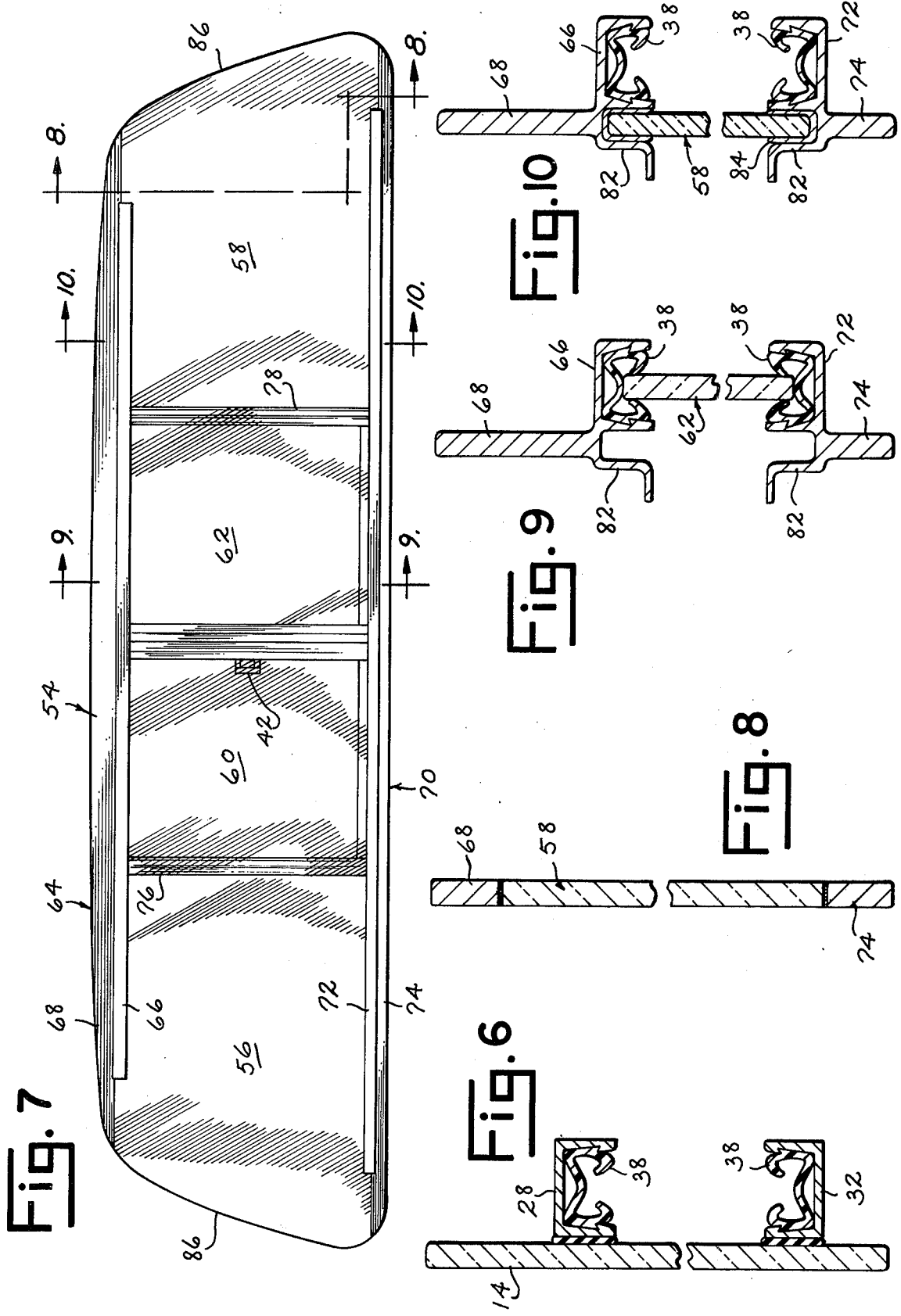

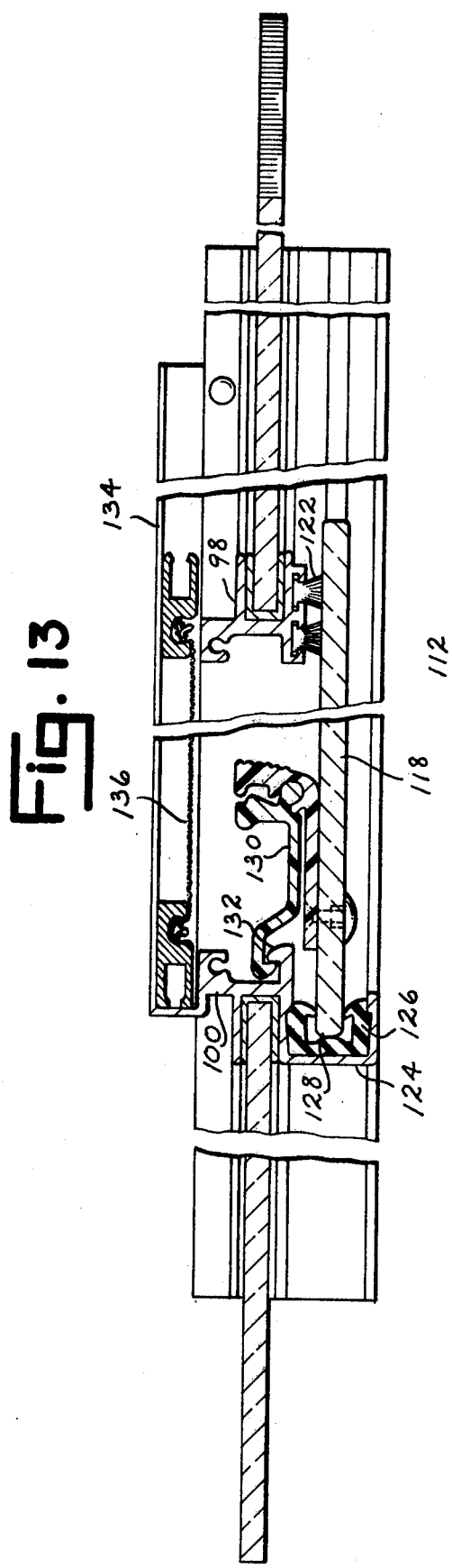
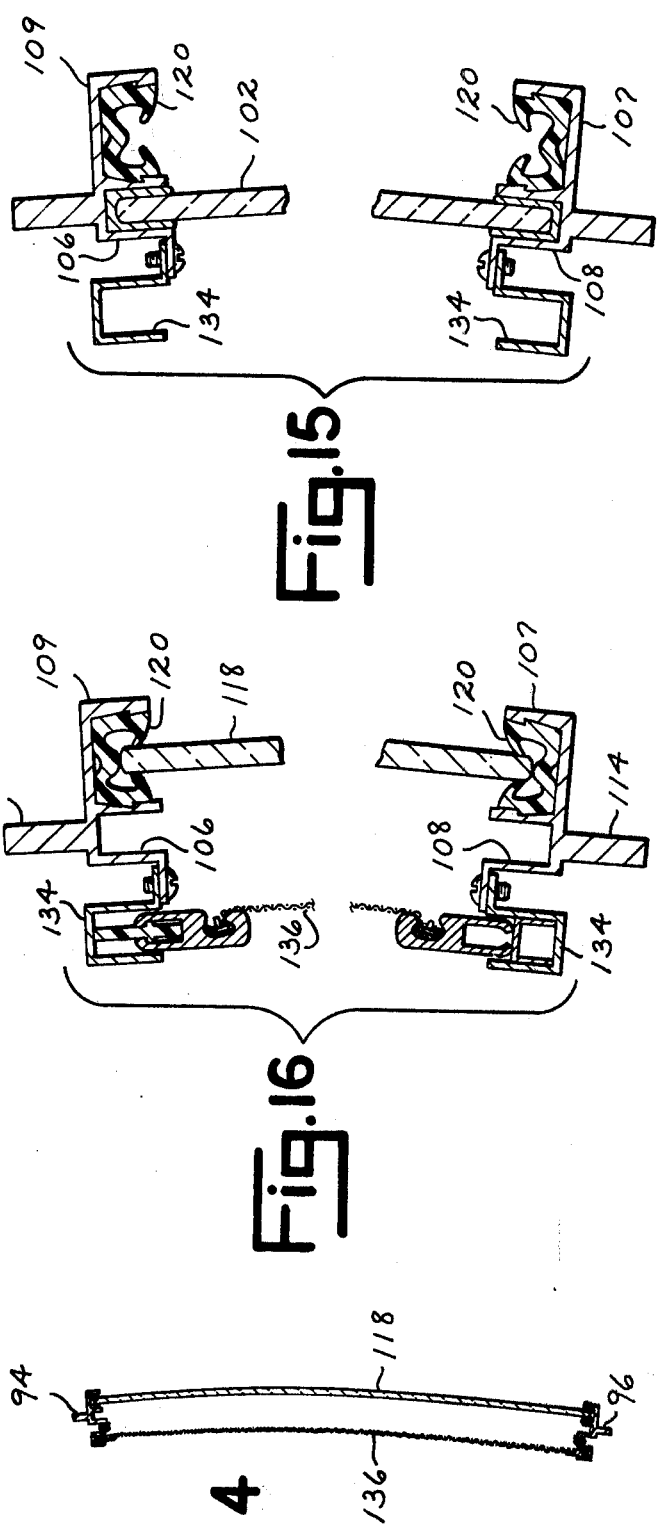

WINDOW ASSEMBLY FOR A VEHICLE

BACKGROUND OF THE INVENTION

This invention relates to a window assembly for a vehicle and will have specific but not limited application to a replacement window having sliding glass panels for use in vans, trucks, and truck caps.

Heretofore window assemblies having sliding glass panels for vans, trucks and similar vehicles have been enclosed in a continuous channel-shaped frame. The ends of the frame are generally rounded which require the frame to be formed by multiple dies. This type construction results in variations in the size and angle of the frame which inturn cause difficulty when the window assembly must be replaced, such as due to a broken or cracked glass panel or a malfunction in the window slide. Additionally, the round ends of such prior art window assembly frames narrows the glass area at the end portions of the assemblies which can cause a wedging of the sliding glass panels when they are fully opened.

In the following described invention the window assembly is designed with a minimum of frame members so as to reduce manufacturing costs and to consistently standardize the size of the assembly, thereby making installation of the assembly in a truck, van or similar vehicle possible with only a minimum of effort.

SUMMARY OF THE INVENTION

The frame of the window assembly of this invention includes an upper horizontal member and a spaced lower horizontal member interconnected by a pair of vertical members which are inwardly set from the ends of the upper and lower horizontal frame members. Each vertical frame member cooperates with the upper and lower frame members to form a C-shaped frame part at each of the end portions of the assembly frame. A glass end panel is carried by each C-shaped frame part with the end panel extending to a vertical frame member. The vertical frame members are spaced apart to form an opening therebetween. A glass center panel is supported for lateral shiftable movement over the center opening between the vertical frame members.

The outer perimeter of the assembly is defined by the upper and lower horizontal frame members and the outer edges of the glass end panels which form the curved ends of the assembly. The upper and lower horizontal frame members need not be formed by bending dies, thus enabling the assembly to be economically produced. Each sliding glass center panel of the assembly is retained between straight guide portions of the upper and lower horizontal frame members and can be slid between opened and closed positions in a non-wedging manner.

Accordingly, it is an object of this invention to provide a window assembly for a vehicle which is of economical construction.

Another object of this invention is to provide a window assembly of simplified operation for a van, truck or truck cap.

Still another object of this invention is to provide a window assembly for a vehicle, such as a truck or van, which have sliding window panels and which can be simply mounted to the vehicle.

Other objects of this invention will become apparent upon a reading of the invention's description.

BRIEF DESCRIPTION OF THE DRAWINGS

FIG. 1 is illustrative of one embodiment of the window assembly of this invention shown mounted as the rear window of a truck cap.

FIG. 2 is a view of the window assembly of FIG. 1 shown in separated form from the truck cap.

FIG. 3 is a fragmentary sectional view of the window assembly taken along line 3—3 of FIG. 1.

FIG. 4 is a elevational view of the window assembly as seen from line 4—4 of FIG. 2.

FIG. 5 is a fragmentary sectional view of the window assembly taken along line 5—5 of FIG. 1.

FIG. 5A is a fragmentary sectional view like FIG. 5 showing the center panel of the assembly unlocked.

FIG. 6 is a fragmentary sectional view taken along line 6—6 of FIG. 4.

FIG. 7 is an elevational view of a modified embodiment of the window assembly of this invention.

FIG. 8 is a fragmentary sectional view taken along line 8—8 of FIG. 7.

FIG. 9 is a fragmentary sectional view taken along line 9—9 of FIG. 7.

FIG. 10 is a fragmentary sectional view taken along 10—10 of FIG. 7.

FIG. 13 is a fragmentary sectional view taken along line 13—13 of FIG. 12.

FIG. 14 is a sectional view taken along line 14—14 of FIG. 12.

FIG. 15 is a fragmentary sectional view taken along line 15—15 of FIG. 12.

FIG. 16 is a detailed sectional view of FIG. 14 shown in fragmentary form.

DESCRIPTION OF THE PREFERRED EMBODIMENTS

Figure 11:
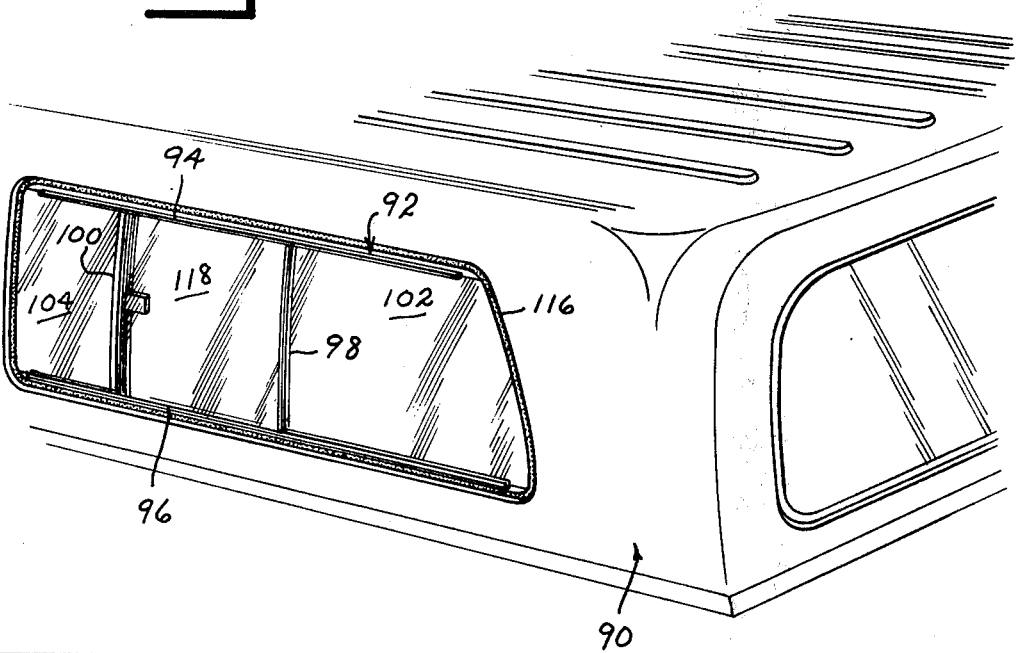
FIG. 11 is a perspective view of a portion of a van body utilizing a modified embodiment of the window assembly of this invention as a side window.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The embodiment of the window assembly illustrated in FIGS. 1-6 includes a frame 10 and a plurality of glass panels, namely, end panels 12 and 14, and sliding center panels 16 and 18. Frame 10, which may be of a metallic or plastic composition, or a combination of metal and plastic, includes an upper horizontal member 20 and a generally parallel lower horizontal member 22 interconnected by vertical frame members 24 and 26. Upper horizontal member 20 of frame 10 includes a channel section 28 and a connected flange section 30 which is centered along channel section 28. Lower horizontal member 22 of frame 10 includes a channel section 32 and a flange section 34 which is connected approximately mid-way between the ends of channel section 32. Vertical members 24 and 26 of frame 10 extend between channel sections 28 and 32 near the ends of flange sections 30 and 34. Each vertical frame member 24 and 26 is channel-shaped and is located within the general plane of flange sections 30 and 34, inwardly set from the ends of channel sections 28 and 32 of horizontal frame members 20 and 22.

Glass end panel 12 is fitted against channel sections 28 and 32 with its inner edge fitted into vertical frame member 24 in abutment with corresponding ends of flange sections 30 and 34. Likewise, glass end panel 14 is fitted against channel sections 28 and 32 with its inner edge fitted into vertical frame member 26 in abutment with the opposite corresponding ends of the flange sections 30 and 34. An adhesive or similar bonding agent is applied between the glass end panels 12 and 14 and overlying channel sections 28 and 32 to secure the glass end panels to frame 10. Glass end panels 12 and 14 protrude beyond the ends of channel sections 28 and 32 and have their respective upper and lower edges in alignment with the respective upper and lower edges of flange sections 30 and 34 of the frame. Vertical frame members 24 and 26 preferably include U-shaped seals 37 to receive the inner edges of the glass end panels.

Glass center panels 16 and 18 extend between channel sections 28 and 32 of the upper and lower horizontal frame members 20 and 22, with the upper and lower edges of the glass center panels fitting into suitable guides 38 carried within the channel sections. The glass center panels are shiftable between a closed position, such as illustrated in FIGS. 1 and 2, overlying the opening or space between vertical frame members 24 and 26 and a laterally spaced or open position to expose the opening between the vertical frame members. When open, glass center panels 16 and 18 overlie respectively glass end panels 12 and 14. Felt seals 40 are carried by vertical frame member 24 and 26 and contact the inner faces of the overlying glass center panels 16 and 18.

Cooperating edge parts 41 are connected to the opposed inner edges of glass center panels 16 and 18. A lock 42 is connected between edges 41 to secure the center glass panels in their closed position, as illustrated in FIGS. 4 and 5. FIG. 5A is illustrative of the manner in which lock 42 is opened to allow glass center panels 16 and 18 to be slid laterally to expose the center opening in frame 10 between vertical frame members 24 and 26. Parallel channel sections 28 and 32 allow glass center panels 16 and 18 to be shifted laterally between their open and closed positions without interference.

When it is desired to insert the window assembly of FIGS. 1-6 within opening 44 in the illustrated truck cap 46, a rubber seal 48 is first placed around the exposed outer edges of glass end panels 12 and 14 and flanged sections 30 and 34 of the upper and lower horizontal frame members 20 and 22. The window assembly with attached seal 48 is then fitted into opening 44 of truck cap 46. Seal 48 is then fitted over window flange 50. This can be accomplished by several well known methods, such as the "zip-in" technique.

In FIGS. 7-10 another embodiment of the window assembly of this invention is illustrated. This window assembly is similar to the window assembly of FIGS. 1-6 in that it includes a frame 54, glass end panels 56 and 58, and glass center panels 60 and 62. Frame 54 of this embodiment includes an upper horizontal member 64 having a channel section 66 and a flange section 68, a lower horizontal member 70 having a channel section 72 and a flange section 74, and channel-shaped vertical members 76 and 78 which extend between horizontal members 64 and 70. Vertical members 76 and 78 are inset from the ends of horizontal members 64 and 70 and are connected to frame flange sections 68 and 74.

The construction of the window assembly of FIGS. 7-10 and operation of its glass center panels 60 and 62 is like that of the window assembly of FIGS. 1-6 and operation of its glass center panels 16 and 18, including the utilization of a lock 42 and guides 38 for the center panels. The construction of the FIGS. 7-10 window assembly differs from the FIGS. 1-6 assembly in that each flange section 68 and 74 of assembly frame 54 extends substantially the length of the assembly and includes a channel part 82 which parallels channel sections 66 and 72 of the respective horizontal frame members 64 and 70. Vertical frame members 76 and 78 in conjunction with channel parts 82 of flange sections 68 and 74 form C-shaped channels at the end portions of frame 54 into which glass end parts 56 and 58 are fitted. A seal 84 is located between the interfitting glass end panel edges and the C-shaped channels formed by cooperating vertical frame members 76 and 78 and flange sections 68 and 74.

The periphery of the window assembly of FIGS. 7-10 is formed by flange sections 68 and 74 of the upper and lower horizontal members 64 and 70, and the end edges 86 of glass end panels 56 and 58. In mounting the window assembly within a body opening in a van, truck or similar vehicle, a seal 48 is applied about the peripheral edge of the assembly.

Figure 12:
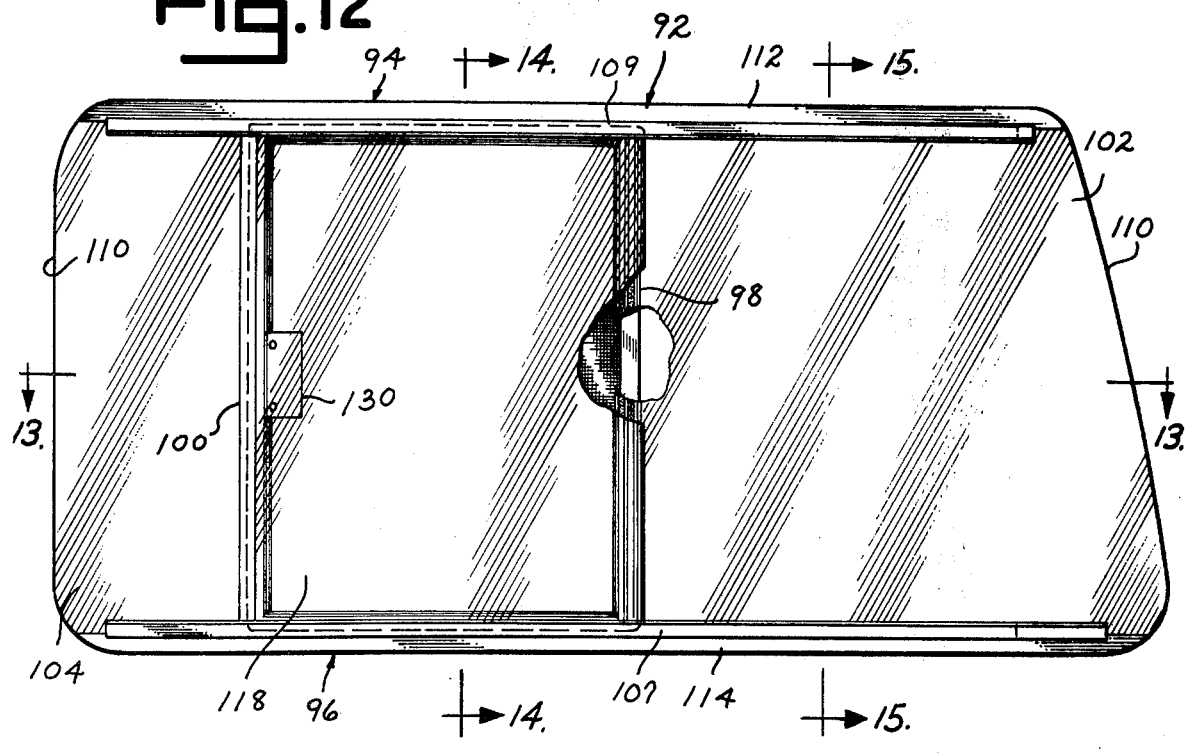
FIG. 12 is an elevational view of the window assembly shown in FIG. 11 with parts broken away for purposes of illustration.

The window assembly illustrated in FIGS. 11-16 is utilized as a side window in a van 90. The construction of this window assembly is similar to that of the window assembly shown in FIGS. 7-10 in that it includes a frame 92 having an upper horizontal member 94, a lower horizontal member 96, and vertical frame members 98 and 100, with glass end panels 102 and 104 fitted into the C-shaped channels formed by the cooperating vertical frame members and channel portions 106 and 108 of the upper and lower horizontal members. The periphery of the window assembly of FIGS. 11-16, like that of the window assembly of FIGS. 7-10, is defined by end edges 110 of glass end panels 102 and 104 and the peripheral edges of flange sections 112 and 114 of the upper and lower horizontal members. The window assembly is inserted into the body opening in van 90 by first applying a seal 116 about the peripheral edges of the assembly and "zippering" or otherwise inserting the sealed assembly into the body opening, overlapping the opening flange in a fashion similar to that described for the installation of the window assembly of FIGS. 1-6. It is to be noted from FIGS. 14-16 that the window assembly in vertical cross section is slightly bowed so as to accomodate the outward curvature of the side wall of the van. In other constructions of this invention the window assembly may be flat, such as in those constructions illustrated for the window assemblies of FIGS. 1-10.

The window assembly of FIGS. 11-16 differs principally from the window assembly of FIGS. 7-10 in that a single glass center panel 118 is supported within guides 120 fitted into channel sections 107 and 109 of horizontal frame members 94 and 96. Vertical frame member 98 carries a weather seal 122 which bears against the inside surface of glass center panel 118 in all of the panel's operative positions. Vertical frame member 100 includes a forwardly projecting channel part 124 which carries a seal 126. When glass center panel 118 is in its closed position as illustrated in the figures, its end edge 128 projects into channel part 124 of vertical frame member 100 and contacts seal 126. A hinge lock 130 is carried at the inside surface of glass center panel 118 adjacent its end edge 128 for the purpose of engaging a lip 132 extending from vertical frame member 100 to secure the glass center panel in its closed position.

In the window assembly of FIGS. 11–16, upper and lower horizontal members 94 and 96 and vertical member 100 of frame 92 include cooperating channel components 134 which generally outline at the inside of the window assembly three sides of the frame opening for glass center panel 118. Fitted slidably between channel components 134 of horizontal members 94 and 96 is a screen member 136. Screen member 136 serves to prevent insects and similar objects from passing through the window assembly when glass center panel 118 is in its open position. To gain access to hinge lock 130 in order to open or close glass center panel 118, screen member 136 need only be slide sideways within channel components 134 of horizontal frame members 94 and 96. In mounting the window assembly to the side of a truck, van or similar vehicle, the left end of the assembly, as viewed in FIG. 12, will be positioned toward the normal direction of travel of the vehicle so as to permit channel part 124 of the assembly to form a weather barrier for glass center panel 118. Like in the window assemblies of FIGS. 1–10, the frame of the window assembly in FIGS. 11–16 may be formed of metal, plastic or a combination of metal and plastic.

The aforedescribed invention is not to be limited to the details above given, but may be modified within the scope of the appended claims.

What I claim is:

1. A window assembly for mounting in a four-sided window opening in a vehicular housing, said assembly comprising a rigidifying frame, first and second glass end panels, a glass center panel, said frame including an upper horizontal member and a spaced lower horizontal member interconnected by a pair of vertical members, said vertical members being spaced apart and inset from the ends of said upper and lower horizontal frame members, each vertical frame member and said upper and lower horizontal frame members forming a C-shaped frame part open at corresponding ends of said upper and lower horizontal frame members, a said glass end panel carried by each C-shaped frame part, each glass end panel extending between said upper and lower horizontal frame members and from a said vertical frame member to corresponding ends of said horizontal frame members, each horizontal frame member including guide means, said glass center panel fitting between said horizontal frame members within said guide means thereof, said guide means for accommodating lateral movement of said glass center panel along said horizontal frame members between a closed position overlying the space between said vertical frame members and an opened position exposing said space between the vertical frame members, said horizontal frame members and glass end panels including cooperating exterior edges having an outline complemental to said window opening and forming the continuous peripheral edge of said assembly.

2. The window assembly of claim 1 and a flexible seal applied about said horizontal frame members and glass end panel exterior edges.

3. The window assembly of claim 1 wherein each horizontal frame member includes a channel section, the channel section of said upper horizontal frame member opposing the channel section of said lower horizontal frame member, said channel sections constituting said guide means.

4. The window assembly of claim 3 wherein said horizontal frame members overlie one side of each glass end panel, bonding material securing each glass end panel to said horizontal frame members.

5. The window assembly of claim 4 wherein each horizontal frame member includes a center section extending from one to the other vertical frame member and opposite end sections extending from said center section, each glass end panel secured by said bonding material to corresponding end sections of said horizontal frame members, said corresponding end sections being inset from the exterior edges of said glass end panels, said center sections of the horizontal frame members defining said exterior edges of said horizontal frame members.

6. The window assembly of claim 5 wherein said glass center panel includes first and second separate coplanar parts spanning the space between said vertical frame members when said glass center panel is in its closed position.

7. The window assembly of claim 3 wherein each horizontal frame member includes a second channel section paralleling its said first mentioned channel section, each glass end panel fitting between said horizontal frame members and including upper and lower edges extending into said second channel sections thereof.

8. The window assembly of claim 7 wherein each glass end panel includes a first side edge and a second side edge, each vertical frame member being channel shaped with the first side edge of a said glass end panel fitting therein, said second side edge of each glass end panel constituting a said cooperating exterior edge complemental to said window opening.

9. The window assembly of claim 8 wherein said center glass panel includes first and second separable coplanar parts spanning the space between said vertical frame members when said glass center panel is in its closed position.

10. The window assembly of claim 7 wherein each horizontal frame member includes a third channel section paralleling said first mentioned and second channel sections thereof, a screen fitting between said horizontal frame members and including upper and lower edges extending into said third channel sections, said third channel sections constituting guide means for accommodating lateral movement of said screen along said horizontal frame members between a closed position spanning the space between said vertical frame members and an open position exposing said space between the vertical frame members.

11. The window assembly of claim 8 wherein one of said vertical frame members includes a channel section, one vertical edge of said glass center panel fitting into the channel section of said one vertical frame member when in its closed position.

* * * * *